United States Patent [19]

Bennett

[11] Patent Number: 4,847,722

[45] Date of Patent: Jul. 11, 1989

[54] REFRIGERATOR AND MICROWAVE OVEN AND OVERDEMAND INTERRUPT CIRCUIT

[76] Inventor: Robert P. Bennett, 49 Francis Wyman Rd., Burlington, Mass. 01803

[21] Appl. No.: 97,680

[22] Filed: Sep. 17, 1987

[51] Int. Cl.[4] .................................................. H02J 1/00

[52] U.S. Cl. ........................................ 361/31; 307/35; 307/39; 219/10.55 B; 219/486; 222/63; 222/129.1; 222/146.1

[58] Field of Search ................... 361/92, 103, 105, 18, 361/31, 33, 58, 187, 195; 307/34, 35, 39, 38, 85-87, 29, 62; 219/10.55 B, 486; 222/52, 54, 63, 129, 129.1, 146.1

[56] References Cited

U.S. PATENT DOCUMENTS

| | | | |
|---|---|---|---|
| 3,005,109 | 10/1961 | Funkhouser et al. | 307/34 |
| 3,066,227 | 11/1962 | Rooney | 307/34 |
| 3,482,509 | 12/1969 | Gardner | 99/357 |
| 4,068,781 | 1/1978 | Toth | 219/485 X |
| 4,225,204 | 9/1980 | Bellavoine | 312/236 |
| 4,398,651 | 8/1983 | Kumpfer | 221/6 |
| 4,472,640 | 9/1984 | Elmer | 307/35 |
| 4,592,485 | 6/1986 | Anderson et al. | 221/150 HC |

*Primary Examiner*—Todd E. Deboer
*Attorney, Agent, or Firm*—Fidelman & Wolffe

[57] ABSTRACT

A microwave oven and a refrigerator are combined into a single cabinet housing a shared power supply with an electrical supply disconnect for the magnetron of the oven during a start-up power demand by the compressor of the refrigerator and for a period of time depending upon a rating of the compressor.

4 Claims, 2 Drawing Sheets

REFRIGERATOR AND MICROWAVE OVEN AND OVERDEMAND INTERRUPT CIRCUIT

PRIOR ART CROSS REFERENCES

U.S. Pat. No. 3,482,509 - Gardner, Sandwich Cooking And Dispensing Machine, issued Dec. 9, 1969.

U.S. Pat. No. 4,225,204 - Bellavoine, Cupboard For Storing Prepared Meals, With Cold-storage And Reheating By Microwaves, issed Sept. 30, 1980.

U.S. Pat. No. 4,398,651 - Kumpfer, Microwave Food Dispensing Machine, issued Aug. 16, 1983.

U.S. Pat. No. 4,592,485 - Anderson, et al, Meal Vending Apparatus, issued June 3, 1986.

BACKGROUND OF THE INVENTION

This invention relates to a refrigerator and microwave oven enclosed in the same cabinet with unique electrical and ventilation supplies, so as to provide the convenience of storing and cooking food simultaneously in the same unit, while limiting peak power demanded by simultaneous operation of the refrigerator compressor and the microwave magnetron. The invention finds particular application in buildings having older wiring and fewer circuits, by minimizing the possibilities of overloading such circuits while providing safe uninterrupted service. It also prevents overloading a more modern circuit which is "dedicated" to the apparatus by preventing operation of the magnetron during start-up of the compressor.

Microwave ovens are now commonly available in quick stop grocery stores and lunch rooms for heating and cooking foodstuffs purchased across the counter and from vending machines. Heretofore though, a microwave oven and refrigerator have not been combined on a smaller scale in the same cabinet, particularly with provision for limiting the peak instantaneous power consumption so as to make the combination useful and attractive for use by students in dorm rooms, resort hotel rooms, tractor trailer cabs, recreational vehicles, so-called pullman efficiencies and the like.

The prior art teaches only the combination of refrigerated storage and a microwave oven in the same vending machine cabinet, particularly coin operated vending machines and provision for transporting a selected item to the microwave oven for heating and subsequent removal from the machine.

Accordingly, it is among the objects of the instant invention to combine prior art appliances into a single more convenient apparatus by utilizing a single molded, insulated shell containing both a microwave oven and a refrigerator, while at the same time providing adequate ventilation of both apparatus and limiting instantaneous peak power consumption by the combination.

SUMMARY OF THE INVENTION

In a preferred embodiment of the invention, a microwave oven and a refrigerator are combined into a single cabinet housing a shared power supply, with disconnect of electrical supply to the magnetron of the oven during a "start-up" power demand by the compressor of the refrigerator and for a period of time depending upon and selectable according to a rating of the compressor.

DETAILED DESCRIPTION OF THE INVENTION

Figure 1:
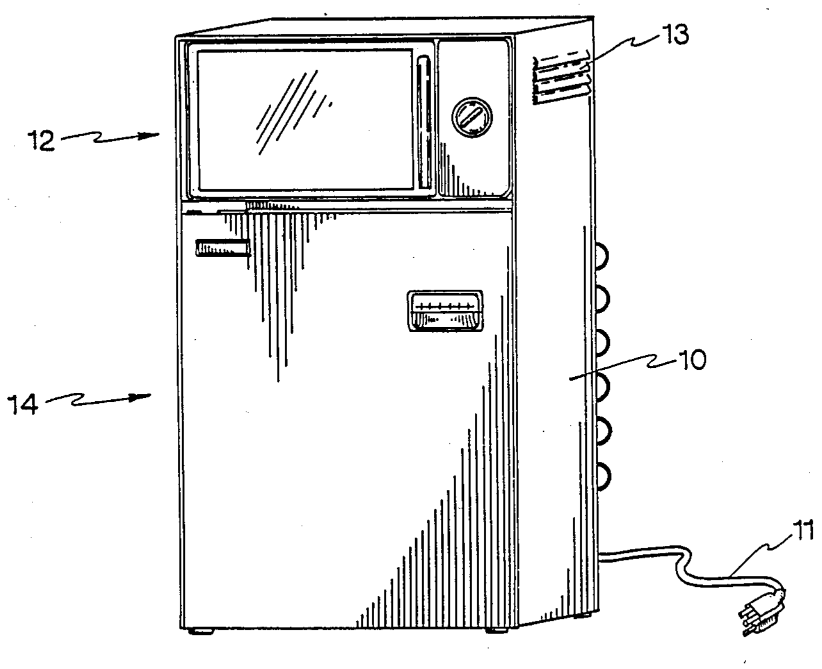
FIG. 1 is an isometric view of a microwave oven and refrigerator sharing a common housing.

Referring to the drawings, cabinet 10 houses a microwave oven upper section 12 and a refrigerator lower section 14, with louvers 13 for venting the microwave section and cord 11 supplying power to the combined refrigerator and microwave device from the standard receptacle.

The basic housing 10 comprises molded inner and outer shells with appropriate insulation therebetween, and these shells may be comprised of several panels defining sides, top, bottom, front and back of the device. The construction of the refrigerator section generally is well known and includes a freezer compartment. Below or at the rear of the refrigeration compartment and above the bottom panel is a refrigeration unit including condenser coils (not shown), while heat transfer mesh or screen is attached at the rear of the unit.

Above refrigerator section 14, and thermally insulated therefrom, is the microwave oven section 12 having the cooking compartment thereof surrounded by an absorptive layer. The absorptive layer is for preventing microwave energy from (1) reflecting from the outer wall and back to the magnetron of the microwave oven and thus damaging the magnetron, (2) warming foodstuffs in adjacent refrigerator compartments, and (3) escaping from the unit to the surrounding environment.

Figure 2:
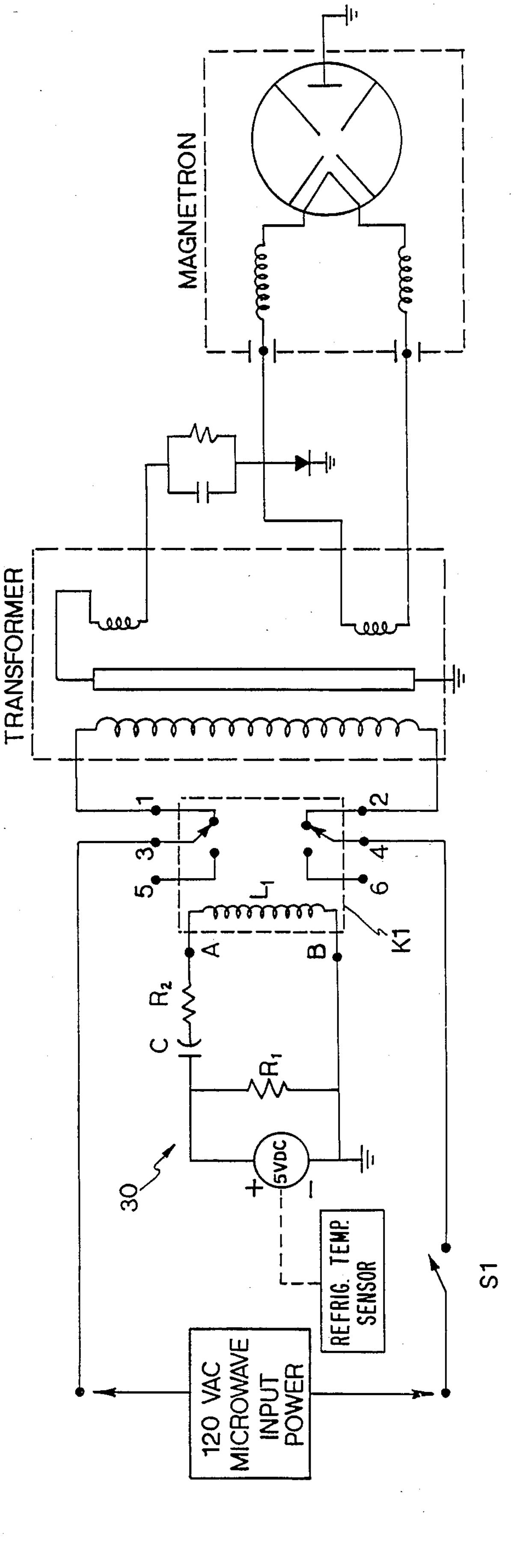
FIG. 2 is a schematic diagram illustrating an electrical circuit providing the time delay of the instant invention.

Of particular importance in the invention is the provision of a timing circuit 30 for controlling power to the magnetron according to the power demands of the compressor of the refrigerator. Referring to FIG. 2, the magnetron of the microwave is conventionally supplied with power via the transformer which, in turn, receives 120 volts AC upon actuation of power switch S1 of the microwave. FIG. 2 includes the additional improvement to this microwave power input circuit of a relay K1 which, in the unenergized state, closes the circuit to the input side of the transformer via contacts 1 and 3 and 2 and 4. When coil $L_1$ of relay K1 is energized, power will be removed from contacts 1 and 2, thus removing power from the magnetron.

Such a provision is of particular benefit in limiting the instantaneous peak power demand of the combined apparatus during start-up periods of energizing the compressor of the refrigerator. FIG. 2 also includes a 5 volt DC supply which actually is present only when the thermostat of the refrigerator outputs a signal for actuation of the compressor of the refrigerator.

With S1 closed and no initial charge on the capacitor C, an overtemperature 5 volt DC signal will pass current through coil $L_1$ and energize relay K1 during charging of capacitor C, thus disconnecting power to the magnetron of the microwave. Capacitor C will charge up according to the time constant determined by the choice of capacitor C and the resistive values $R_1$ and $R_2$, after which coil L1 of relay K1 will become deenergized and power wil be resupplied to the magnetron of the microwave oven. Actually, current limiting resistor $R_2$ may not be necessary depending upon the requirements of relay $K_1$.

Thus, if the magnetron of the microwave oven is already in operation and the thermostat of the refrigerator supplies an overtemperature signal indicating the need for operation of the compressor, the signal from the thermostat may be used to start timing circuit 30 and thus disconnect power from the magnetron. An interrupt time period is determined by the RC time constant selected, according to the rating of the particular compressor used, so that the magnetron will not be drawing power when the compressor kicks on.

For the case where the switch $S_1$ is closed during the start-up period of the compressor, the five volts DC signal will still have been supplied by the thermostat so that timing circuit 30 will be operational already to insure that relay K1 will not allow supply of power to the magnetron until this peak demand from the compressor has subsided.

Tests have shown that although a prototypical compressor usually draws only about 4 amps during operation, there is a start-up period of about 2-3 seconds during which the current demand can be threefold, or about 12 amps. Thus, operation of a magnetron (drawing its general 5 amps) simultaneously with the compressor during start-up thereof could overload a 15 amp circuit.

In implementing the invention, it is contemplated that the combined cabinet will be approximately 36 inches high, 18½ inches wide and 18 inches deep and that the oven, freezer and refrigeration compartments can be altered in placement as well as size, and that a variety of additional components such as clocks, radios, alarms, or smoke detection devices can be added to the unit. Materials used for the exterior of the unit can bring additional utility to the apparatus such as, for example, a butcher block top. A typical relay considered sufficient for purposes of the invention is the general purpose miniature relay of the K10 series by Potter and Brumfield Relays.

Having described the invention, it will be seen that the objects set forth above, among those made apparent from the preceding description, are efficiently obtained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention hereindescribed, and all statements of the scope of the invention which, as a matter of language, might be said to fall therebetween.

Now that the invention has been described, I claim:

1. In a refrigerator having a compressor and a microwave having a magnetron combined in a single cabinet housing a power supply shared by said refrigerator and microwave oven, the improvement comprising:

means for sensing an overtemperture condition within a food storage portion of said refrigerator;

means for preventing electrical supply to said magnetron from said power supply through a closed input power switch upon said sensing and during only a compressor start-up power demand time interval wherein said time interval is set by a circuit according to a rating of said compressor and said time interval being substantially constant;

2. The improvement as in claim 1, wherein said circuit comprises an RC circuit.

3. The improvement as in claim 1, wherein said circuit comprises:

an RC circuit means for controlling a relay according to a time constant of said RC circuit.

4. In a method of operating a refrigerator having a compressor and a microwave oven having a magnetron, said refrigerator and microwave being combined in a single cabinet housing a power supply shared by said refrigerator and microwave oven, the improvement comprising the steps of:

sensing an overtemperature condition within a food storage portion of said refrigerator and upon said sensing;

preventing electrical supply to said magnetron from said power supply through a closed input power switch during only a compressor start-up power demand time interval;

said time interval being set by a circuit according to a rating of said compressor and said time interval being substantially constant.

* * * * *